United States Patent
Amirijoo et al.

(10) Patent No.: US 8,504,046 B2
(45) Date of Patent: Aug. 6, 2013

(54) FAST RADIO LINK RECOVERY AFTER HANDOVER FAILURE

(75) Inventors: Sharokh Amirijoo, Sollentuna (SE); Ingrid Viola Nordstrand, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 12/811,178

(22) PCT Filed: Jan. 3, 2008

(86) PCT No.: PCT/SE2008/050006
§ 371 (c)(1),
(2), (4) Date: Jun. 29, 2010

(87) PCT Pub. No.: WO2009/084998
PCT Pub. Date: Jul. 9, 2009

(65) Prior Publication Data
US 2010/0279695 A1 Nov. 4, 2010

(51) Int. Cl.
*H04W 4/00* (2009.01)
*H04W 36/00* (2009.01)

(52) U.S. Cl.
USPC ............... 455/438; 455/436; 370/331

(58) Field of Classification Search
USPC .................. 455/436–443; 370/331
See application file for complete search history.

(56) References Cited

U.S. PATENT DOCUMENTS

2001/0021650 A1* 9/2001 Bilgic ............... 455/418
2008/0132240 A1* 6/2008 Baek et al. ............ 455/442

FOREIGN PATENT DOCUMENTS

EP 1879416 A1 1/2008
WO WO 2008024064 A2 2/2008

* cited by examiner

Primary Examiner — Nizar Sivji

(57) ABSTRACT

A radio connection is supported between the mobile station and a source base station associated with a source cell. The mobile station transmits information to the source base station over a shared uplink data communications channel used by multiple mobiles. A handover message is received from the source base station indicating that the source base station has initiated a handover of the radio connection over to a target base station for the target base station to support the radio connection. The handover fails. In response, a message is sent from the mobile station to the source base station requesting that the source base station continue to support the radio connection without requiring the mobile station to perform a radio channel procedure competing with other mobile stations requesting a new radio connection be supported by the source base station.

8 Claims, 7 Drawing Sheets

FAST RADIO LINK RECOVERY AFTER HANDOVER FAILURE

TECHNICAL FIELD

The technology described here relates to cellular radio communications, and more particularly, to recovering from a handover failure.

BACKGROUND

Handover is a process where the support of a radio connection with a mobile radio station is "handed over" from a source cell currently supporting the radio connection to another target cell. Often, such a handover is done because the mobile is moving away from the source cell's base station towards the target cell's base station. Different types of handovers are possible such as a hard handover (sometimes described as "break-before-make"), a soft handover (sometimes described as "make-before-break"), or a softer handover (soft handover between sector cells controlled by the same base station). Sometimes handover attempts fail, and the question is what happens to the connection. In a worst case situation, the connection is dropped, which requires the user to reinitiate the radio connection. A best case is where the source base station continues to support the connection.

In some cellular systems, mobile connections are supported using shared radio resources, e.g., a shared channel. A shared channel can be more efficiently operated then a dedicated channel. But shared channels require some way to regulate access to the shared resources. For an uplink shared channel, for example, mobiles can be scheduled for uplink transmission, or random access attempts to acquire uplink transmission resources can be regulated using some sort of contention resolution procedure. In either situation, when there is a failed handover attempt for a radio connection on a shared channel, there will likely be some delay as the mobile station must compete, often times in a random access process, with other mobile stations to reacquire uplink resources to support its radio connection. That delay can be substantial depending on the demand for radio resources in that source cell at the time. Indeed, in an example contention-based random access procedure, the mobile station might randomly select the same random access preamble (a known bit sequence used in the random access procedure) as one or more other mobile stations trying to establish a connection in the source cell, lose the contention for radio resources at the end of the random access process even if different preambles are selected, and be forced to restart such a random access procedure. In any event, it would be desirable to avoid these types of delays resulting from a failed handover so that there is no significant interruption in service.

SUMMARY

These and other problems are overcome by the technology described below. A radio connection is supported between the mobile station and a source base station associated with a source cell. The mobile station transmits information to the source base station over a shared uplink data communications channel shared by multiple mobiles. A handover message is received from the source base station indicating that the source base station has initiated a handover of the radio connection over to a target base station for the target base station to support the radio connection. The handover fails. In response, a message is sent from the mobile to the source base station requesting that the source base station continue to support the radio connection without requiring the mobile station to perform a radio channel procedure competing with other mobile stations requesting a new radio connection be supported by the source base station.

A mobile station communicates over a radio connection supported between the mobile station and a source base station associated with a source cell. The mobile sends uplink radio connection communications using a shared uplink data communications channel shared by multiple mobile stations. The mobile station includes a radio transmitter for transmitting information to the source base station over the shared uplink data communications channel, and a radio receiver for receiving a handover message from the source base station indicating that the source base station has initiated a handover of the radio connection over to a target base station for the target base station to support the radio connection. The mobile station includes electronic circuitry that is configured to detect that the attempted handover failed and to generate a message to be transmitted to the source base station via the transmitter requesting that the source base station continue to support the radio connection.

The mobile station determines that a predetermined time period has expired before the message is sent and sends a request via the transmitter that the radio connection be re-established with the source base station. Before sending the message to the source base station, the mobile determines whether it is synchronized with the source base station, and if so, the message is sent. The predetermined time period is associated with a synchronization time period. The synchronization time period is associated with an uplink timing alignment command received from the source base station after sending an uplink transmission to the source base station. If the predetermined time period has expired, the mobile must perform a random access procedure to request resources to re-establish the connection on the shared uplink radio channel. But if the predetermined time period has not expired, the mobile station sends a scheduling request to the source base station, and after receiving an uplink transmission grant from the source base station, sends the message to the source base station requesting that the source base station continue to support the radio connection.

The source base station includes a radio receiver for receiving information from the mobile station, a connection processor that initiates a handover for the radio connection to a target base station for the target base station to take over support of the radio connection, and a radio transmitter for sending a handover command to the mobile station indicting initiation of a handover of the radio connection over to the target base station. The connection processor detects that the attempted handover failed and continues to support the radio connection based on a message received from the mobile station requesting that the source base station continue to support the radio connection without requiring the mobile station to perform a radio channel procedure competing with other mobile stations requesting a new radio connection be supported by the source base station.

In a preferred example embodiments, the connection processor may allocate uplink radio transmission resources using persistent scheduling, semi-persistent scheduling, or non-persistent scheduling.

In other preferred example embodiments, the connection processor sends a timing message to the mobile station via the radio transmitter just before sending the handover message. After the handover failure and receiving from the mobile station a scheduling request, the connection processor sends an uplink transmission grant to the mobile station, and thereafter, receives the message from the mobile station. The connection processor may also reserve scheduling request (SR) resources at a first time periodicity for the mobile station to request uplink transmission resources over the shared uplink data communications channel and then reconfigure the reserved SR resources to a second shorter time periodicity just before or during the initiated handover.

As a result of this technology, an on-going radio communication can be re-established in the source cell quickly and with certainty. There is no risk after handover failure of losing the contention in a random access process and having to restart such a random access procedure. The time delay for re-establishing communication in the source cell is significantly decreased because less signalling is needed between the source cell and the mobile station to verify the mobile station's identity. Avoiding the risk of a dropped connection and extended delay as a result of a failed handover is particularly important when the mobile station is on edge of a cell where the radio channel conditions may be rapidly changing in one or both of the source and target cells.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). It will be apparent to one skilled in the art that other embodiments may be practiced apart from the specific details disclosed below.

Figure 1:
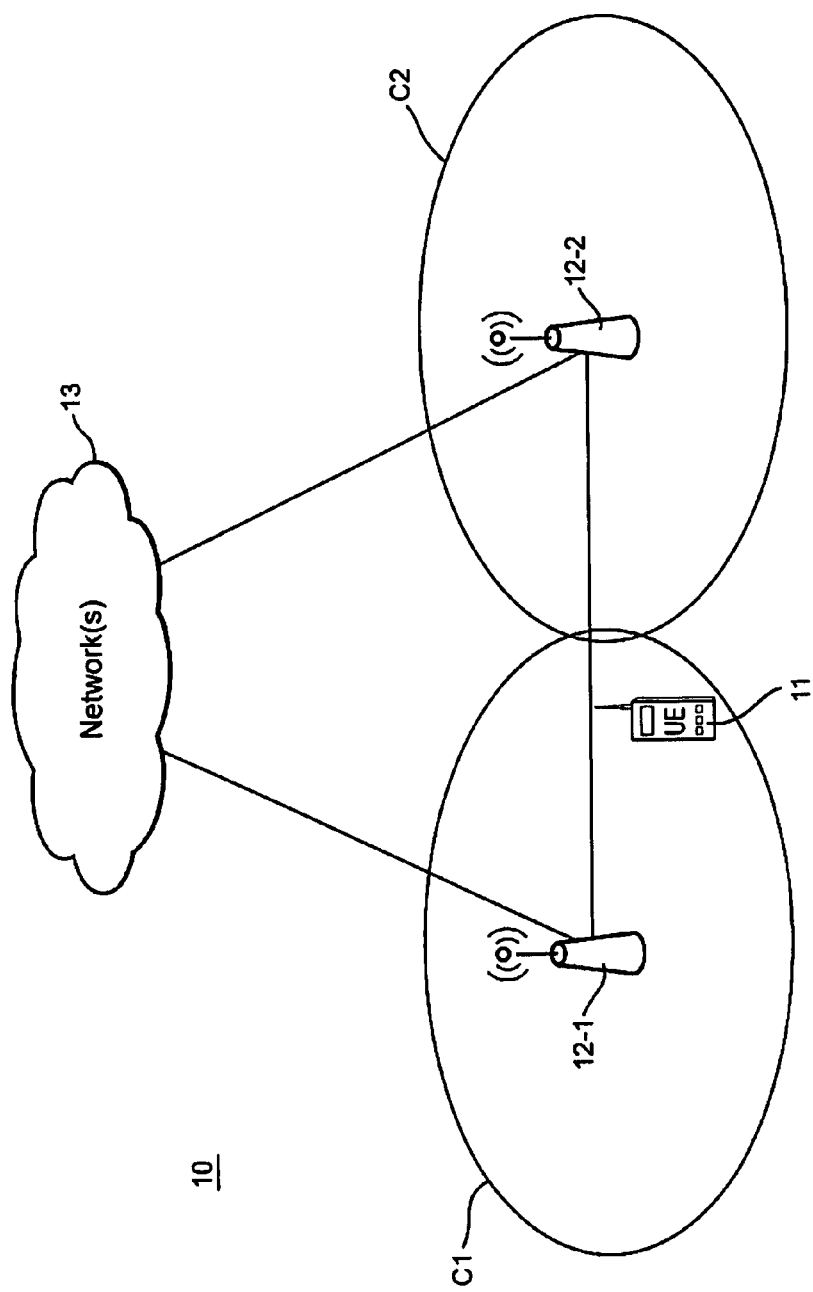
FIG. 1 illustrates an example simplified mobile radio communication system.

FIG. 1 illustrates an example simplified mobile radio communication system 10 that provides mobile radio communications services to multiple mobile stations 11 which are sometimes referred to as mobile terminals, user equipments (UEs), mobile radios, mobile telephones, etc. Only two cell areas C1 and C2 are shown for illustration purposes only, each being served by a corresponding base station 12-1 and 12-2, respectively. The base stations 12-1 and 12-2 may communicate with each other and with one or more other networks 13 over appropriate communications interfaces.

Initially, a communication or connection is established with the mobile station 11 in cell C1 via a "serving" base station 12-1. As the mobile station 11 moves towards adjacent cell C2, it detects an increasingly higher quality signal from the base station 12-2 as compared to signals received from its serving base station 12-1 from which the mobile station is moving away. The mobile station 11 sends a measurement report based on this information to its serving base station 12-1, which decides to initiate a handover of the connection to the base station 12-2. In this handover scenario, the serving base station 12-1 is an example of a source base station and base station 12-2 is called a target base station. Although most handovers are completed successfully, a variety of factors may cause the handover process to fail including, for example, a change of radio environment from when the handover measurements were performed, non-homogenous radio coverage, lack of capacity in the target cell, etc.

Figure 2:
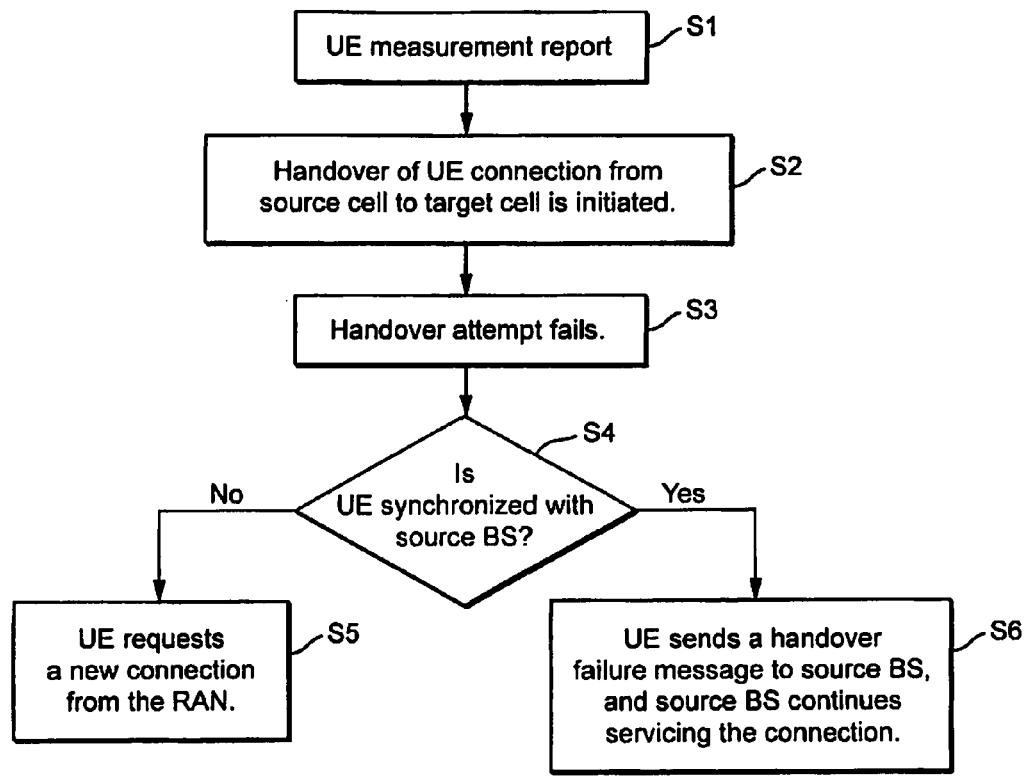
FIG. 2 is a flowchart illustrating non-limiting, example procedures for managing a failed handover attempt.

FIG. 2 is a flowchart illustrating non-limiting, example procedures for effectively managing a failed handover attempt. It is assumed that a radio connection has been established between a mobile station and a base station, and that the base station is referred to as a source base station for purposes of handover. The flowchart begins noting that the mobile station has at some point sent a handover measurement report of the sort described above to the source base station (step S1). This report may trigger a decision to hand the connection over from the source base station to a target base station resulting in the initiation of a handover procedure (step S2). If the handover attempt fails (step S3), a determination is made whether the mobile station is synchronized with the source base station (step S4).

Because the mobile station and the source base station have been communicating, the mobile station is usually still synchronized with the source base station, at least for a short time after the handover attempt fails. In that case, the mobile station sends a message to the source base station, e.g., a handover failure message, notifying the source base station of the handover failure and requesting the source base station to continue to service the connection (step S6). Consequently, the mobile station user experiences no loss in service of the connection, and delays associated with the mobile station having to compete e.g., in a random access process, with other mobiles in order to reacquire uplink resources to support that radio connection are avoided. On the other hand, if the mobile station is not synchronized with the source base station, the mobile station employs normal procedures necessary for acquiring a connection with the source base station (step S5).

Figure 3:
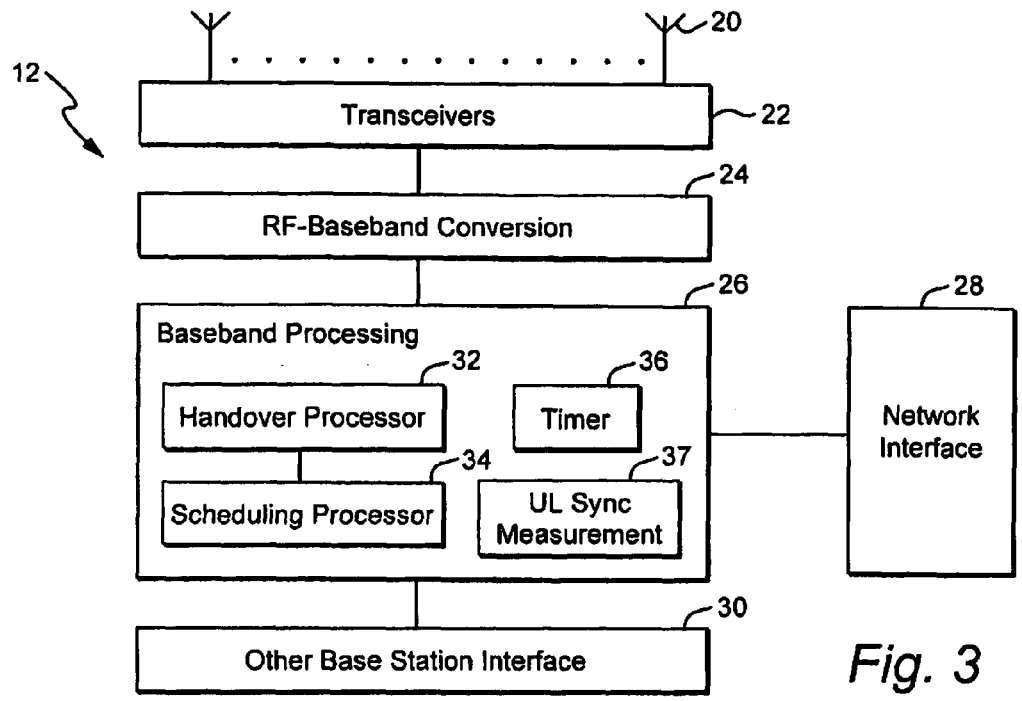
FIG. 3 is a non-limiting example function block diagram of a base station.

FIG. 3 is a non-limiting example function block diagram of a base station 12 such as the source and/or the target base station. The base station 12 includes one or more radio transceivers 22 coupled to one or more antennas 20 for transmitting and receiving information over a radio interface. The one or more radio transceivers 22 are also coupled to radio frequency (RF) conversion circuitry 24 for converting received radio signals to baseband frequency and for converting baseband signals to be transmitted to radio frequency. The baseband circuitry 26 is coupled to a network interface 28 for communicating with one or more external networks 13 and to a base station interface 30 for communicating with one or more other base stations, e.g., in order to orchestrate a handover. The baseband circuitry 26 includes a handover processor 32 for receiving and processing measurement reports from mobile stations and for initiating handover operations when appropriate. A scheduling processor 34 in the baseband circuitry 26 is used to manage and allocate uplink radio resources, e.g., by sending uplink resource grants to requesting mobile stations.

The base station 12 also includes a timer 36 used to determine how long the mobile station is considered to be synchronized with the base station during periods when the mobile station has not sent an uplink transmission to the base station. At each uplink transmission from the mobile station, an uplink synchronization measurement unit 37 measures the mobile station's uplink timing. If it is necessary to adjust that timing, then the uplink synchronization measurement unit 37 generates a Timing Alignment (TA) command which is sent to the mobile station to adjust its uplink timing relative to the downlink reference in the base station's cell. This allows the mobile station to become and remain synchronized to the base station. The base station may periodically require the mobile station to make an uplink transmission so as to measure the uplink timing and make necessary adjustments, e.g., by sending periodic Timing Alignment (TA) commands. Each TA command received by the mobile station causes the mobile station to send an uplink data transmission (e.g., a HARQ ACK) which can then be used for the uplink timing measurements at the base station. The Timing Alignment command may be sent either as a dedicated massage or included in some other message, e.g., in a Random Access Response message to the mobile station.

Figure 4:
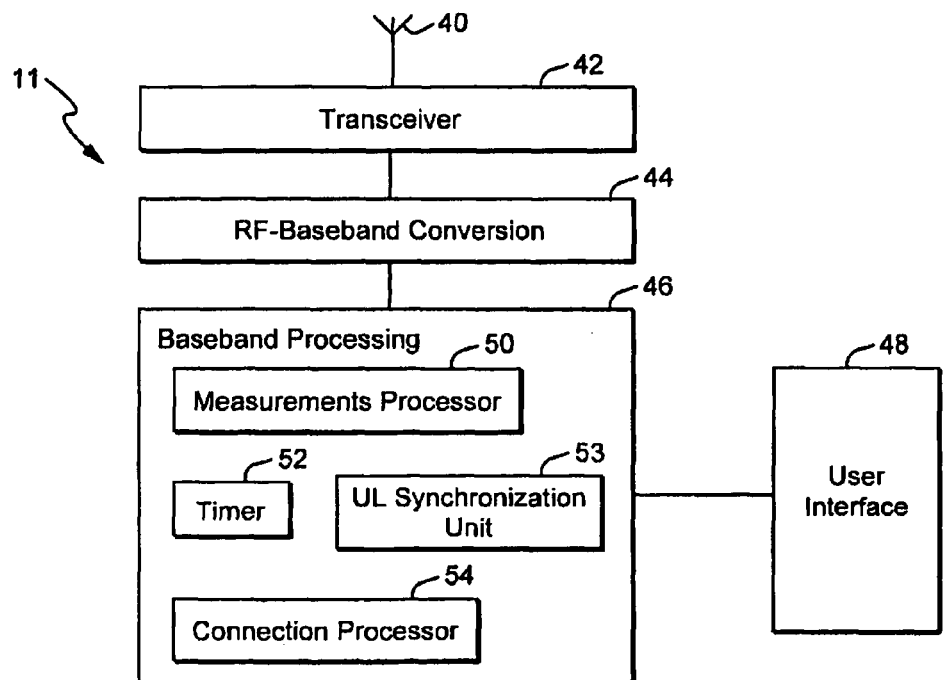
FIG. 4 is a non-limiting example function block diagram of a mobile station.

FIG. 4 is a non-limiting example function block diagram of a mobile station 11. The mobile station 11 includes a radio transceiver 42 coupled to one or more antennas (usually just one) 40 for transmitting and receiving information over a radio interface. The radio transceiver 42 is also coupled to radio frequency (RF) conversion circuitry 44 for converting received radio signals to baseband frequency and for converting baseband signals to be transmitted to radio frequency. The baseband circuitry 46 is coupled to a user interface 48, e.g., keypad, display, speaker, microphone, USB port, etc. The baseband circuitry 26 includes a measurements processor 32 for measuring the signal quality of signals received from neighboring base stations and sending measurement reports to the source base station. Those reports may be used by the source base station to initiate a handover operation when appropriate. A connection processor 54 in the baseband circuitry 26 is used to request, establish, and manage a connection with the base station. For example, for a shared uplink radio channel, the connection processor 54 may request uplink resource grants from the source base station for uplink transmission of information over the shared channel. Another example is handover operations.

The mobile station also includes a timing alignment timer 52 and an uplink synchronization unit 53. While the timer 52 is running, the mobile station is considered synchronized in the uplink and can make uplink transmissions without first performing a random access procedure. The timer 52 is started and restarted based on the Timing Alignment (TA) command received from the source base station. The TA command provides to the uplink synchronization unit 53 timing adjustment information produced based on the uplink timing synchronization measurements made by the uplink synchronization measurement unit 37 in the source base station. The TA command may be sent periodically or as the result of uplink timing synchronization measurements performed in the uplink synchronization unit 37 in the source base station.

The connection processor 54 uses information associated with one or both of the timers 36 and 52 when a handover attempt fails in order to determine whether the mobile station is still in synchronization with the source base station. If so, the connection processor 54 sends a message to the source base station, e.g., a handover failure message, notifying the source base station of the handover failure and requesting the source base station to continue to service the connection. If not, the connection processor 54 follows normal procedures necessary to obtain timing synchronization, e.g., a random access procedure, and after the RA procedure, the mobile station informs the source base station by sending the handover failure message.

Figure 5:
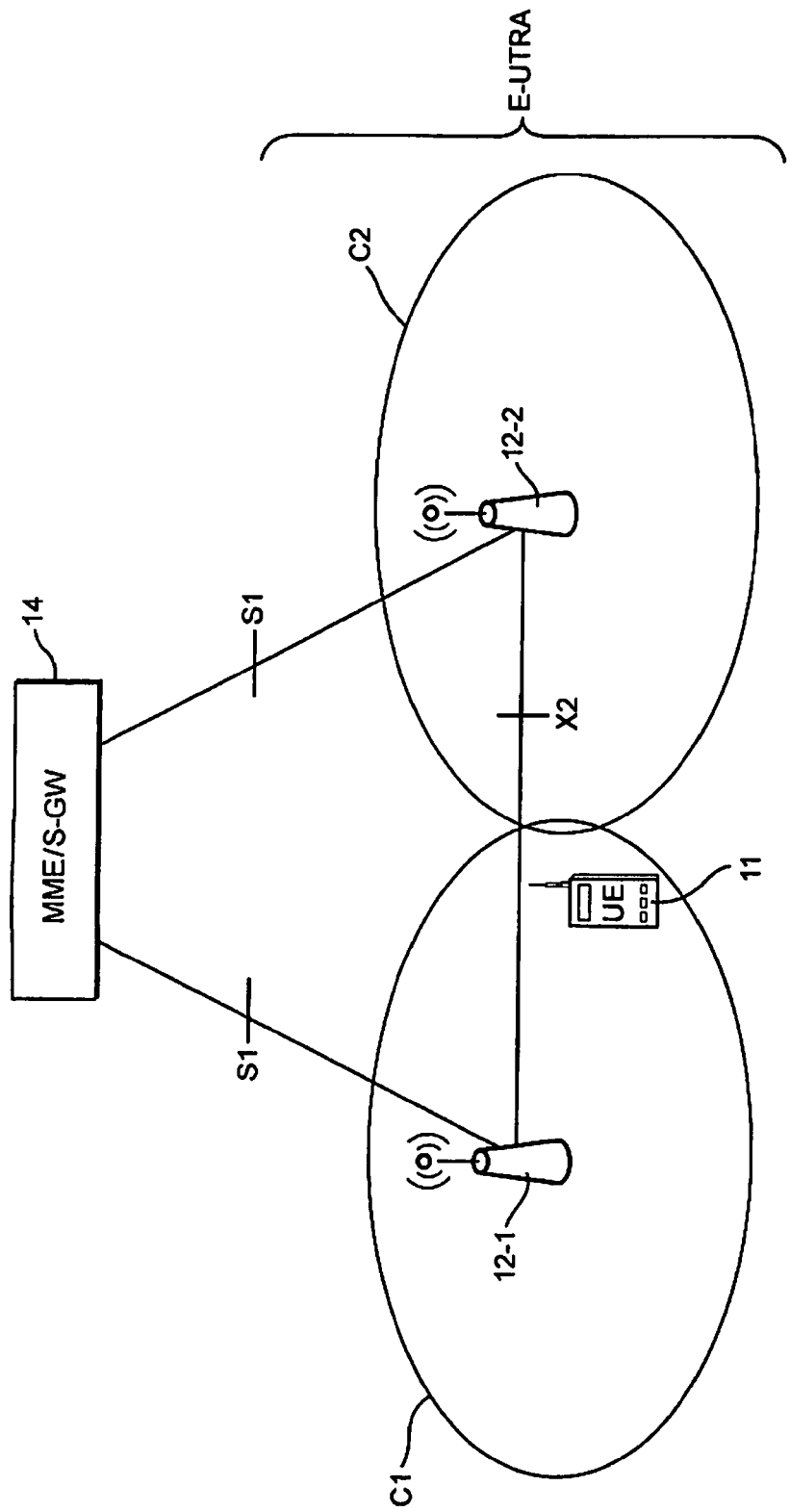
FIG. 5 illustrates an example simplified E-UTRA mobile radio communication system.

FIG. 5 illustrates an example application of the technology to a simplified Evolved-Universal Terrestrial Radio Access (E-UTRA) mobile radio communication system. E-UTRA is often referred to as LTE (Long Term Evolution). Mobile stations are called UEs in E-UTRA terminology. Communications with UEs in the first cell C1 are controlled by a first radio base station 12-1, and communications with UEs in the second cell C2 are controlled by a second radio base station 12-2. In E-UTRA, the radio base stations are called eNBs (evolved Node Bs), and they communicate with each other via an X2 interface as illustrated. The eNBs are also connected to core network nodes via an S1 interface. The core network nodes in the figure include an MME (Mobility Management Entity) and S-GW (Serving-GateWay) 14.

Figure 6:
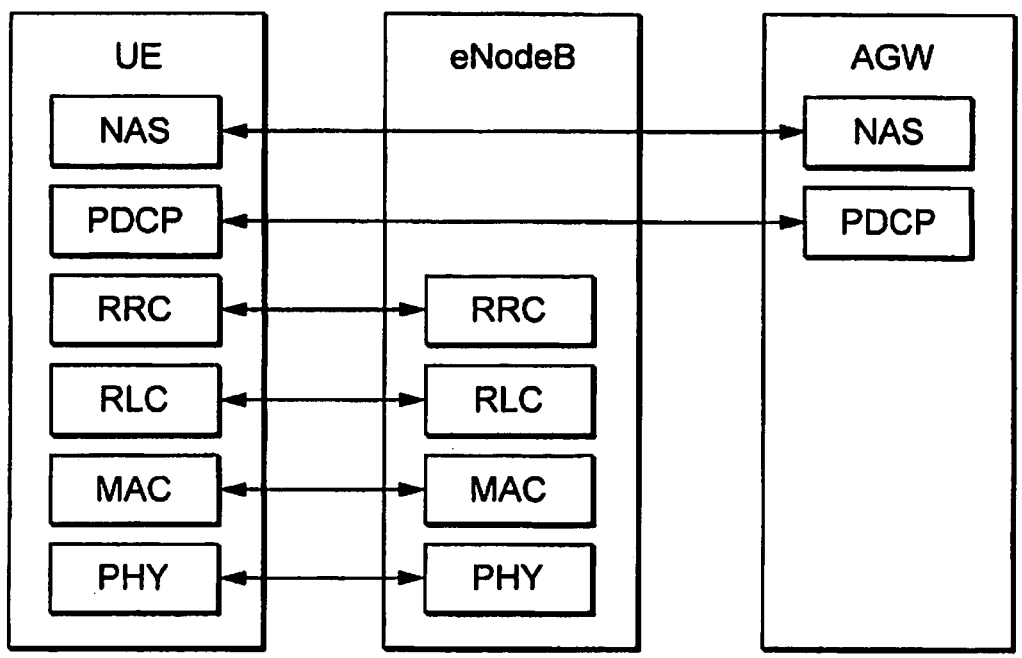
FIG. 6 is a protocol stack of the E-UTRA radio interface control plane.

FIG. 6 illustrates non-limiting, example communications protocol stacks in the UE, the eNB, and the AGW used in E-UTRA systems. For the E-UTRA example described below, the Radio Resource Control (RRC) layer is the protocol layer of interest. The RRC controls and builds a UE context when UE 11 is in active mode. Active mode may be entered when the UE registers in the cell or when the first UE enters the a cell via handover from another cell. Further information regarding the protocols shown in FIG. 6 is available in 3GPP TS 36.300.

As in FIG. 1, cell C1 in FIG. 5 supports a connection with a mobile station 11, and eNB 12-1 is the source base station with respect to that connection. Uplink and downlink data transmissions between the mobile station and the source base station are sent over a shared uplink data communications channel UL-SCH and a shared downlink data communications channel DL-SCH which are also shared by over active radio connections. When the mobile station 11 approaches the second cell C2, source base station eNB 12-1 decides that the support of the connection should be handed over to the second cell C2 and initiates a handover process, such as the process illustrated in FIG. 7 described below. During the handover process, the mobile station 11 leaves the source cell C1 to enter the target cell C2.

The following is a brief explanation of traffic and control channels in E-UTRA. In E-UTRA, the UE uses downlink and uplink shared channels, i.e., the DL-SCH and the UL-SCH, respectively, to receive or transmit data. Since these channels are shared resources, the UE needs to be scheduled by the eNB sending to the UE Downlink Assignment or Uplink Grant messages on a downlink control channel (PDCCH). These messages indicate to the UE explicitly which radio resources to use at the specified time for receiving data on the DL-SCH or transmitting data on the UL-SCH. The UE monitors the PDCCH to receive these scheduling messages addressed to that UE. For uplink transmission, the UE needs to also inform the eNB that it has data to transmit, which the UE does by sending a request for resources via a Scheduling Request (SR) message on the Physical Uplink Control Channel (PUCCH) or a Buffer Status Report (BSR) message on the PUSCH (UL-SCH) if the mobile station has already been granted PUSCH resources. The BSR message is similar to the SR message but also contains more information about how much data the UE has in its buffer which need to be transmitted. Normally, a request for uplink resources begins by the UE first sending a SR, receiving an uplink grant, and then sending a BSR and some of the data from the UE's buffer. Based on the BSR, the eNB decides how much and for how long to schedule the UE uplink transmission.

Figure 7:
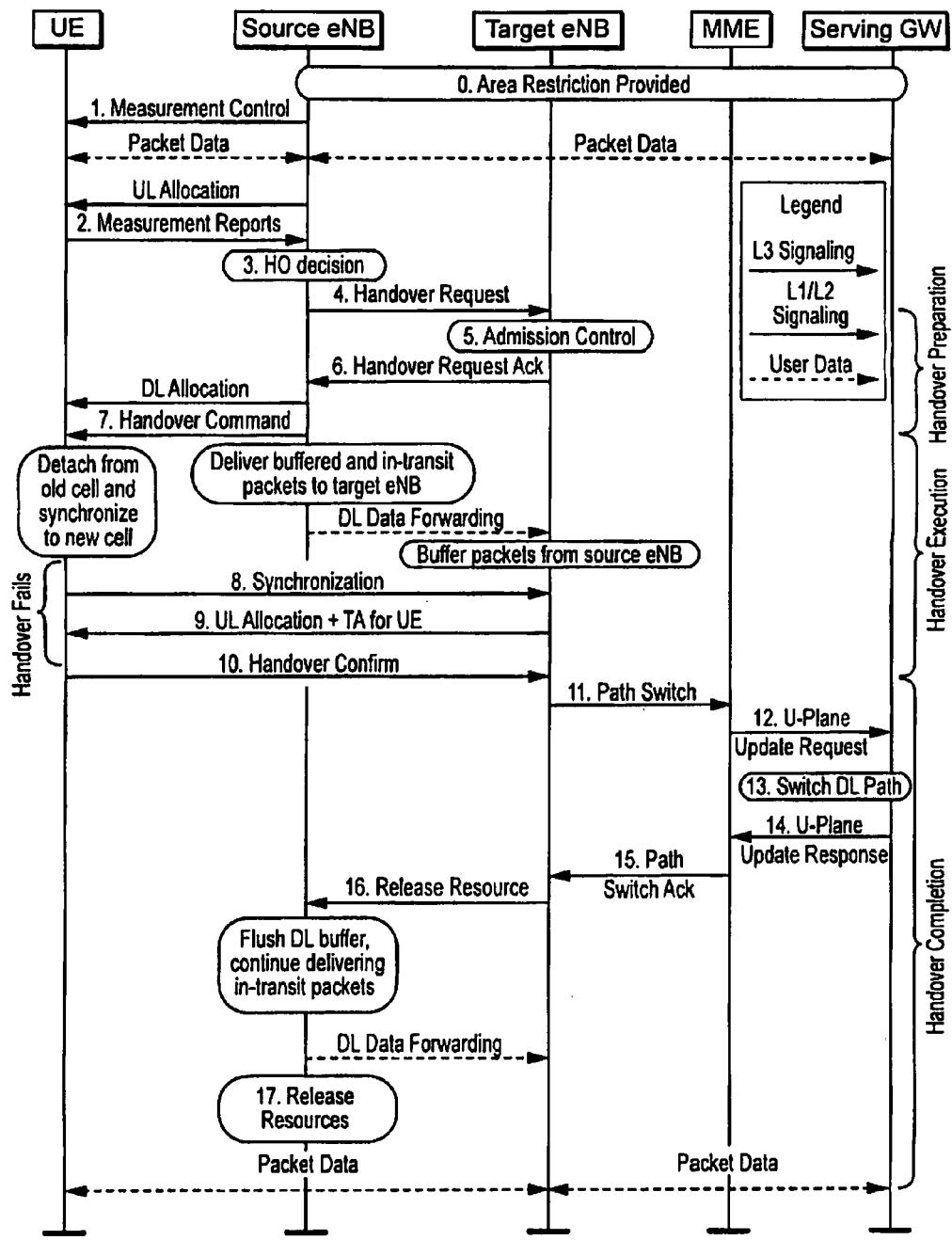
FIG. 7 is a non-limiting example signaling diagram for a handover procedure tailored to the example E-UTRA mobile radio communication system in FIG. 5.

FIG. 7 is a non-limiting example signaling diagram for a handover procedure tailored to the example E-UTRA mobile radio communication system of FIG. 5. It is based on the 3GPP Technical Specification (TS) 36.300, V 8.2.0, CH. 10.1.5.1. The source eNB 12-1 decides on whether to handover. The decision is typically based on measurement reports received from the UE 11. The source eNB 12-1 initiates the handover by sending a handover request to the target eNB 12-2. The handover request includes information on the UE 11 identity. Assuming that the target eNB 12-2 agrees to accept the handover, the target eNB 12-2 acknowledges the handover request. The source eNB 12-1 sends a handover command to the UE 11 over the downlink control channel (PDCCH), which includes information on the target cell identity and the target cell preamble. The UE 11 sends the target cell preamble on the uplink PRACH (Physical Random Access Channel). The target eNB 122 identifies the received preamble as coming from the UE 11 that it is assigned to. If all goes as planned, the UE synchronizes with the target base station 12-2 and then receives an uplink timing alignment (TA) information (included in the random access response from the target base station) and an uplink transmission resource allocation from the target base station in the random access response and/or over the target base station's physical downlink control channel (PDCCH), after which the UE confirms the handover.

Assume though that something causes the handover to fail as indicated in FIG. 7. Even though resources for communication with the mobile station are maintained in the source cell during the handover process in E-UTRA, if the handover fails, the UE must contend with other UEs in an attempt regain access to the source cell C1's uplink resources. An example methodology for doing that in E-UTRA is a contention-based random access procedure described in 3GPP TS 36.300, V 8.2.0, in sub-clause 10.1.5.1 The UE 11 starts the random access process by randomly selecting a preamble within a group of possible preambles. The UE 11 sends the randomly-selected preamble over the random access control channel (RACH) to the source eNB 12-1. The source eNB 12-1 in return sends a random access response that includes an identifier of the preamble used by the UE 11 and a temporary identity of the UE 11 in the cell. The temporary identifier is called a temporary C-RNTI (Cell-Radio Network Temporary Identifier). Next, the UE 11 makes a first scheduled transmission on the Uplink Synchronization Channel (UL-SCH) that includes a unique UE identity. The random access process is finished when the source eNB 12-1 sends a contention resolution message to the UE 11. If more than one UE selected the same preamble for random access during the same period, only one is addressed in the contention resolution message by reference to the unique UE identity.

If the UE 11 is not addressed in the contention resolution message from the source eNB 12-1, it has lost the random access contention. The UE must then restart the random access process by transmitting a randomly-selected preamble over the RACH to the source eNB 12-1. The UE waits for a contention resolution message addressed to it during a predefined time period after sending the preamble. Consequently, even if a contention resolution message has been addressed to the one of the UEs winning the contention, the losing UEs must wait until the time period is ended before they restart the random access procedure.

The contention-based random access procedure requires four signaling messages before UE can inform the source eNB that it would like to access the source eNB again by sending a RRC Connection Reconfiguration Failure message. A non-contention-based random access procedure may also be used. An example is set forth in sub-clause 10.1.5.2 of 3GPP TS 36.300, V 8.2.0, where a dedicated preamble signature allocated in the source cell may be used by the UE when trying to access the source cell again. Even with a non-contention-based random access procedure, three signaling messages must be sent before the UE can send the RRC Connection Reconfiguration Failure message. So both access procedures require extra signaling and cause delay.

Each cell offers a variety of services. Services may include real-time and non real-time services. Examples of real-time services include voice over IP (VoIP) and video streaming. For real-time services, radio resources are pre-allocated and signaled to the UE during radio bearer establishment. The UE uses these resources during the life-time of the connection. This resource allocation method is called persistent scheduling. However, a more realistic resource usage is called semi-persistent scheduling, where in some scenarios due to the need for retransmissions or because of collision with other UE transmissions, allocated radio resources need to be reconfigured. In these reconfiguration cases, the eNB instructs the UE to change to other radio resources via the downlink assignment/uplink grant. For non-real-time services (e.g., internet browsing), radio resources are allocated only when the UE needs to receive or transmit data using what is called non-persistent or dynamic scheduling. To be able to transmit data on the uplink, the UE sends a scheduling request (SR) to the eNB on the PUCCH. The UE is configured to use dedicated resources on the PUCCH to transmit the SR. Each UE has its own dedicated resource on the PUCCH.

When a handover attempt fails for a non-persistent, dynamically-scheduled radio bearer or semi-persistent scheduled bearer (e.g., used in VoIP), radio resources for the Scheduling Request (SR) on the PUCCH in the source cell are maintained, reconfigured, or new resources are allocated for a predetermined time period sufficient to allow the UE re-enter the source cell. In one example embodiment, SR resources may be reconfigured/allocated just prior to handover. In typical traffic scenarios where the UE actively uses traffic channels UL-SCH and DL-SCH, e.g., when browsing internet, the time intervals when SR resources are allocated to the UE occur with greater frequency or with a shorter time periodicity in order to reduce latency. But because the SR resources are limited, the SR resources for a UE which become less active over the time (e.g., the UE user is reading a long newspaper article after a web download) may be reconfigured to occur less frequently or with a longer periodicity. Therefore, in this situation, the SR resources may be reconfigured to a shorter periodicity during or just before a handover to allow the UE to quickly re-establish the RRC connection after the handover failure to the target cell.

There are various ways to reconfigure SR resources. For example, the reconfiguration may be based on the validity (how long the SR resource allocation is valid, i.e., an expiration time) of the SR resources for the UE about to make a handover. In a typical handover failure case, the UE can re-access the source cell rather quickly after handover failure, i.e., before the expiration time expires. The UE's SR resources may then be revoked after the expiration time. However, the UE context may be retained in the source base station longer than the expiration time in case the UE sends a random access message to re-access the source cell.

Figure 8:
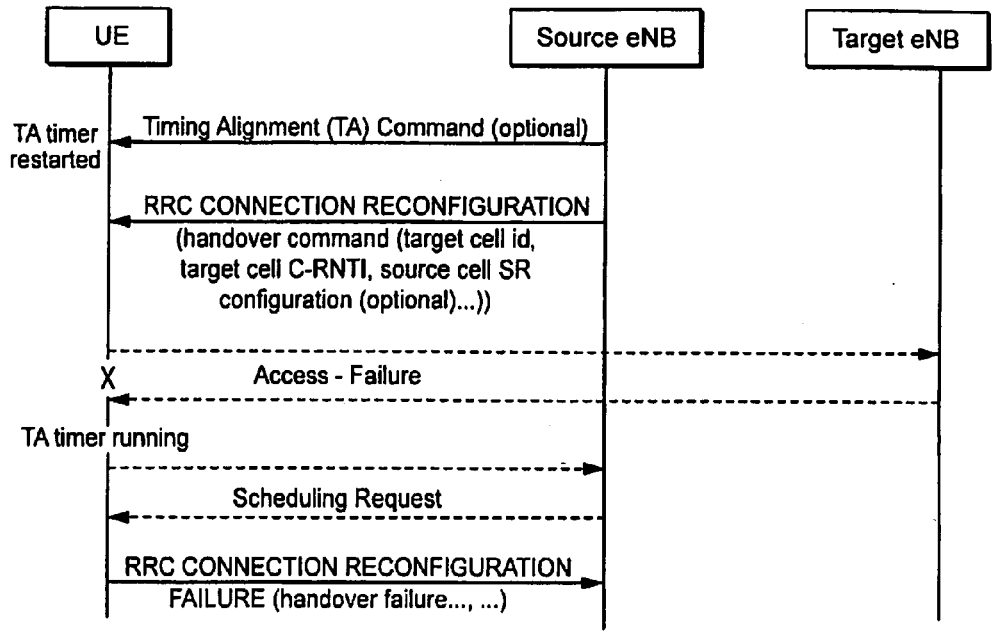
FIG. 8 is a non-limiting example signaling diagram for recovery from a failed handover procedure tailored to the example E-UTRA mobile radio communication system in FIG. 5.

Reference is made to FIG. 8 which is a non-limiting example signaling diagram for recovery from a failed handover procedure tailored to the example E-UTRA mobile radio communication system in FIG. 5. The UE preferably receives a timing alignment (TA) message (described above) from the source eNB to update/maintain timing synchronization with the source eNB. The UE receives an RRC Connection Reconfiguration message informing the UE that the connection will be handed over to the target eNB. The message includes for example a handover command, with a target cell ID, a target cell C-RNTI, and a source cell scheduling request (SR) configuration. There are other options for signaling SR configuration information. One example is a separate message on the media access control (MAC) protocol layer (Layer 2) rather than a Layer 3 signaling protocol layer as described above. The source cell SR configuration includes the details about the SR resources allocated to the UE on the PUCCH, i.e., which of the SR resources are allocated to the UE, its periodicity (how often these can be used, e.g., every $10^{th}$ ms), how long the SR resources are valid (e.g., 100 ms) for this particular UE, and so forth. The source cell scheduling request (SR) configuration may be signaled by other signaling messages on the RRC or MAC layers.

When a handover fails, "Access-Failure," the UE transmits a Scheduling Request (SR) message to the source eNB to obtain a grant in the UL. When the source eNB sends that scheduling grant to the UE, the UE then sends an RRC Connection Reconfiguration Failure message to the source eNB to indicate the handover failure and to request that the eNB continue to support the UE connection. As a result, the UE does not have to perform a random access procedure to re-gain access to the source cell.

One condition preferably fulfilled in the E-UTRA context is that the Timing Alignment (TA) timer 52 in the UE has not expired so that the UE can transmit the scheduling request (SR) when a handover fails. As explained above, while the UE's TA timer 52 is running, the UE is considered synchronized with the source eNB on the uplink. The TA timer 52 may be started/restarted every time the UE receives a Timing Alignment command message from the source eNB. That TA message contains information regarding how much the UE needs to adjust the timing of its uplink transmission so that the data is received by the eNB in the correct time period. As a practical matter, if the UE is inactive and is not sending uplink transmissions, the eNB is not able to calculate the current timing alignment for the UE which means that the TA timer 54 in the UE is not reset and thus expires. In this situation, the UE is considered out of synchronization, and in order to access the radio network, the UE must follow the random access procedures to re-again timing alignment and to receive an uplink grant for further uplink data transmission. A non-limiting example value for TA timer value is enough time for the UE to return to the source cell after a handover failure.

Figure 9:
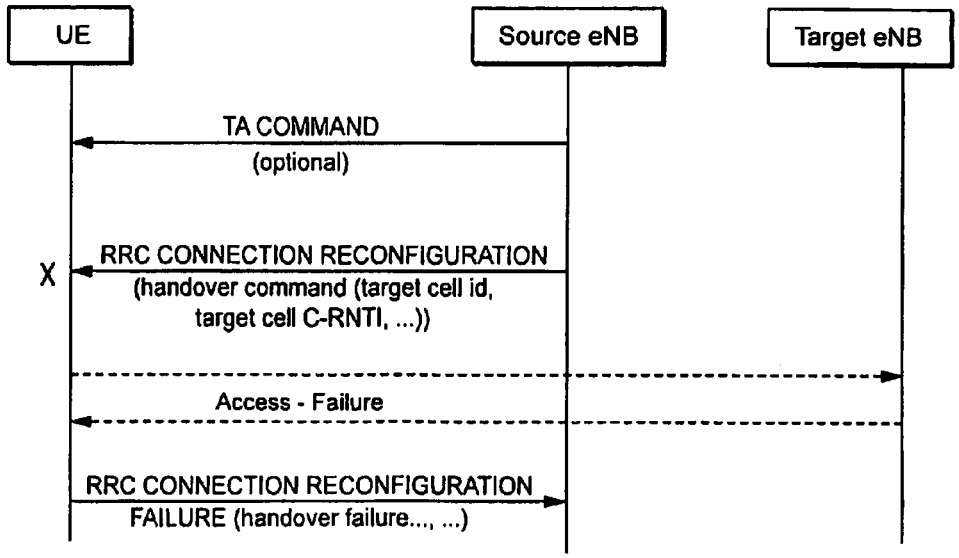
FIG. 9 is another non-limiting example signaling diagram for recovery from a failed handover procedure tailored to the example E-UTRA mobile radio communication system in FIG. 5.

In order to ensure that the timer 52 does not expire during a handover procedure, the source eNB may send a Timing Alignment (TA) command just prior to the RRC Connection Reconfiguration message, as shown in FIGS. 8 and 9, which restarts the UE's TA timer 52. Often, a handover is initiated by the UE sending a measurement report message to the source eNB which results in the eNB sending a handover command. The UE's measurement report or any uplink transmission from the UE sent just prior to the handover command message may be used to trigger transmission of the timing alignment message to the UE.

FIG. 9 is a non-limiting example signaling diagram for recovery from a failed handover procedure which is similar to FIG. 8 except that the scheduling request signaling is not needed because of the persistent scheduling. In the case of persistent scheduling, the reserved uplink radio resources on the PUSCH are maintained in the source cell for a predetermined time period which can then be used when UE comes back to the source cell by sending the RRC Connection Reconfiguration Failure (Handover failure) message to the source eNB.

In radio bearer configurations that use persistent scheduling, the UE does not have to schedule resources on the Physical Uplink Control Channel (PUCCH). But for most practical cases, pure persistent scheduling may not exist but instead are more likely realized by semi-persistent scheduling. Semi-persistent scheduling can be viewed as a combination of the persistent scheduling periods and non-persistent scheduling periods. During the persistent scheduling periods, the resources are always allocated to the UE on predefined resources and with a predefined periodicity. For the non-persistent scheduling periods, the persistent scheduling resources are revoked, and the resources are allocated dynamically on a need basis, which means a SR resource on the PUCCH is needed.

In order to save resources, given that most handovers are successful, the limited PUSCH resources in a persistent scheduling situation may be de-allocated in an alternative example implementation when the handover command is issued. In that case, the eNB may instead allocate the SR on the PUCCH that is sent to the UE in the Handover command as in the case of non-persistent scheduling. The SR resource on the PUCCH consumes less radio resources than the persistent PUSCH resources allocated for the UE connection. In this case, the signaling sequence can the same as in FIG. 8.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a mobile station where a radio connection is supported between the mobile station and a source base station associated with a source cell, where uplink radio connection communications are performed using a shared uplink data communications channel shared by multiple mobile stations, the method comprising:

transmitting information to the source base station over the shared uplink data communications channel;

receiving a handover message from the source base station indicating that the source base station has initiated a handover of the radio connection over to a target base station for the target base station to support the radio connection;

detecting that the attempted handover failed;

determining that a predetermined time period has expired before a message requesting that the source base station continue to support the radio connection is sent;

requesting the connection with the source base station be re-established; and before sending the message to the source base station, determining whether the mobile station is synchronized with the source base station, and if so, sending the message to the source base station requesting that the source base station continue to support the radio connection.

2. The method in claim 1, wherein the synchronization time period is associated with an uplink timing alignment adjustment received from the source base station after sending an uplink transmission to the source base station.

3. The method in claim 1, wherein if the predetermined time period has expired, the mobile station performs a random access procedure to request resources to re-establish the connection on the shared uplink radio channel.

4. The method in claim 1, wherein if the predetermined time period has not expired, the mobile station sends a scheduling request to the source base station, and after receiving an uplink transmission grant from the source base station, the mobile station sends the message to the source base station requesting that the source base station continue to support the radio connection.

5. A mobile station for communicating over a radio connection supported between the mobile station and a source base station associated with a source cell, where uplink radio connection communications are performed using a shared uplink data communications channel shared by multiple mobile stations, the mobile station comprising:

a radio transmitter for transmitting information to the source base station over the shared uplink data communications channel, a radio receiver for receiving a handover message from the source base station indicating that the source base station has initiated a handover of the radio connection over to a target base station for the target base station to support the radio connection, and electronic circuitry configured to:

detect that the attempted handover failed;

determine that a predetermined time period has expired before a message requesting that the source base station continue to support the radio connection is sent, wherein the predetermined time period is associated with a synchronization time period, request the connection with the source base station be re-established, and before sending the message to the source base station, determine whether the mobile station is synchronized with the source base station, and if so, send the message to the source base station requesting that the source base station continue to support the radio connection generate a message to be transmitted to the source base station via the transmitter requesting that the source base station continue to support the radio connection.

6. The mobile station in claim 5, wherein the synchronization time period is associated with an uplink timing alignment adjustment received from the source base station after sending an uplink transmission to the source base station.

7. The mobile station in claim 5, wherein if the predetermined time period has expired, the electronic circuitry is configured to perform a random access procedure to request resources to re-establish the connection on the shared uplink radio channel.

8. The mobile station in claim 5, wherein if the predetermined time period has not expired, the mobile station sends a scheduling request to the source base station, and after receiving an uplink transmission grant from the source base station, the electronic circuitry is configured to send the message to the source base station requesting that the source base station continue to support the radio connection.

\* \* \* \* \*